(12) United States Patent
Ganz

(10) Patent No.: US 8,061,721 B2
(45) Date of Patent: Nov. 22, 2011

(54) MOVABLE HOT TUB COVER APPARATUS

(76) Inventor: Jonathan E. Ganz, Orangevale, CA (US)

( * ) Notice: Subject to any disclaimer, the term of this patent is extended or adjusted under 35 U.S.C. 154(b) by 0 days.

(21) Appl. No.: 12/454,959

(22) Filed: May 27, 2009

(65) Prior Publication Data

US 2009/0295107 A1 Dec. 3, 2009

Related U.S. Application Data

(60) Provisional application No. 61/130,008, filed on May 27, 2008.

(51) Int. Cl.
*B62B 1/26* (2006.01)
*B62J 11/00* (2006.01)
(52) U.S. Cl. .......................... 280/35; 280/202
(58) Field of Classification Search .................. 280/202, 280/35, 79.4; 193/42; D34/17, 20, 23; 248/371, 248/456, 473
See application file for complete search history.

(56) References Cited

U.S. PATENT DOCUMENTS

| | | | | |
|---|---|---|---|---|
| 1,604,723 A * | 10/1926 | Rutherford | ............... | 280/47.131 |
| D127,916 S * | 6/1941 | Whitefield | ...................... | D34/23 |
| 2,816,771 A * | 12/1957 | Hunt | .......................... | 280/47.131 |
| D202,493 S * | 10/1965 | Gibbens | .......................... | D34/20 |
| 3,233,753 A * | 2/1966 | Rich | ........................... | 280/47.18 |
| D219,649 S * | 1/1971 | Salcman | ........................ | D34/17 |
| 3,586,345 A * | 6/1971 | Nall | ........................... | 280/47.331 |
| 3,860,078 A * | 1/1975 | Stoick | ............................ | 180/183 |
| 4,679,805 A * | 7/1987 | Cunningham | ........... | 280/33.991 |
| 4,867,465 A * | 9/1989 | Dunchock | .................... | 280/79.3 |
| D324,597 S * | 3/1992 | Zeidler | ......................... | D34/17 |
| 5,163,695 A * | 11/1992 | Pakowsky | ................... | 280/79.7 |
| 5,445,279 A * | 8/1995 | Warner | ........................ | 211/195 |
| D362,565 S * | 9/1995 | Tubbs et al. | .................... | D6/419 |
| 5,921,521 A * | 7/1999 | Fitzsimmons et al. | ........ | 248/450 |
| 6,120,043 A * | 9/2000 | Crowley et al. | .............. | 280/79.2 |
| 6,324,708 B1* | 12/2001 | Langley | ........................... | 4/559 |
| D453,155 S * | 1/2002 | Michel | ........................ | D14/253 |
| 6,454,282 B2* | 9/2002 | Sexton et al. | ................ | 280/79.7 |
| 6,561,530 B2* | 5/2003 | Carbonero | ............... | 280/87.041 |
| 6,824,152 B1* | 11/2004 | Scott | ............................. | 280/79.7 |
| 6,974,140 B2* | 12/2005 | Neuman | .................... | 280/79.11 |
| D520,708 S * | 5/2006 | Allen | ........................... | D34/28 |
| 7,036,833 B1* | 5/2006 | Berna et al. | ................. | 280/79.11 |
| D532,953 S * | 11/2006 | Lauer et al. | ..................... | D34/23 |
| D550,921 S * | 9/2007 | McMorris et al. | ............. | D34/23 |
| 7,490,839 B2* | 2/2009 | Perelli et al. | ................. | 280/79.3 |

* cited by examiner

*Primary Examiner* — Joanne Silbermann
*Assistant Examiner* — Daniel Yeagley

(57) ABSTRACT

The apparatus of the present invention provides the user with a receptacle for a hot tub cover that can be moved away from the hot tub thereby preventing blocking of the view. The apparatus of the present invention is dimensioned such that it will accept both foldable and non-foldable type covers and can be used with both round and rectangular tubs. Further, the vertical support member of the apparatus is angled such that when the cover is stored it is prevented from blowing out.

2 Claims, 5 Drawing Sheets

Section A-A

MOVABLE HOT TUB COVER APPARATUS

This non-provisional utility patent application claims the benefit of provisional application No. 61/130,008 filed May 27, 2008.

BRIEF DESCRIPTION

The subject of this invention relates to hot tubs, or as they are alternatively referred to, spas. Specifically, the disclosed invention presents an apparatus that may be used to store the cover away from the hot tub when in use, thereby preventing the loss of view that occurs with conventional, non-movable hot tub covers.

BACKGROUND OF THE INVENTION

Hot tubs, or spas as they are sometimes denominated, have been in use for many years. Modernly, both fixed and portable hot tubs are in wide use. These hot tubs come in a variety of geometries, but are generally round or rectangular. Common to most hot tubs is a cover that is used to keep the water from cooling off when the hot tub is not in use. These covers are constructed of a thick insulation and have a fabric skin to protect the underlying insulation.

While not true for virtually all hot tub covers, far and away the majority are dimensioned approximately the same. The covers have a foam insulating section that is four to six inches thick and a vinyl or canvas covering skin to protect the foam from harmful solar rays and weather. Many of the contemporary covers fold in half in order to allow the user to remove the cover for use. Common to these covers are two elements: they are awkward and bulky, and they are heavy after the insulation has become saturated with water. This saturation occurs due to water vapor condensation from the underlying body of water.

Contemporary hot tub covers appear in two main design camps. The first is the free standing type cover. In this design the user must remove the cover and wrestle it to a temporary storage place during hot tub use. Due to the large sail area involved, any breeze will make the cover very difficult to handle and can cause injury to the user. However, this type of design does have the advantage of removing the cover completely from the view of the hot tub user.

The second design type is the hinged cover. In this design a frame is attached to the hot tub and the cover then attached to the frame by some mechanical means. When the user desires to enter the hot tub, the cover is folded or lifted and then folded, with the bulk of the force being taken up by the hinge mechanism. This neatly solves the problem of the stand alone covers, but introduces a highly undesirable problem; the user's view is blocked by the cover on the end of the tub to which the hinge mechanism is attached.

What would be desirable would be a hot tub cover storage apparatus that would eliminate both the problem with the difficulty in handling associated with stand alone covers and at the same time the view blockage problem associated with the hinged type covers.

SUMMARY OF THE INVENTION

The apparatus of the present invention provides the user with a receptacle for a hot tub cover that can be moved away from the hot tub thereby preventing blocking of the view. The apparatus of the present invention is dimensioned such that it will accept both foldable and non-foldable type covers and can be used with both round and rectangular tubs. Further, the vertical support member of the apparatus is angled such that when the cover is stored it is prevented from blowing out.

The apparatus of the present invention has several embodiments. Common to all embodiments is a base member, an upright back member, and a front lip member that extends slightly above the base member. Advantageously, the front surface of the upright back member is angled back and away from the base member such that when a hot tub cover is placed on the base member and leaned rearward, gravity holds the hot tub cover firmly in place, preventing the cover from being blown out in a breeze.

In a first embodiment the face of the front lip member is an essentially flat surface such that the present invention may be placed in close proximity to the side of a rectangularly shaped hot tub prior to moving the cover from the top of the hot tub to the apparatus for storage while the hot tub is in use. In a second embodiment of the present invention the front lip member has a concave face to allow the apparatus to snugly fit against round or circular hot tubs prior to moving the cover from the top of the hot tub to the apparatus for storage.

In a third and forth embodiment of the present invention a set of wheels are mounted to the underside surface of the base member of either of the first two embodiments above to allow the apparatus to be moved away from the hot tub while it is in use. Beneficially, this removes the stored hot tub cover completely from the view of the users, overcoming one of the primary disadvantages of prior art hot tub covers. The wheels are of the lockable type such that once the apparatus of the present invention has been moved away from the hot tub it may be prevented from moving about due to wind.

Each of the above embodiments of the present invention is discussed in detail in conjunction with the drawings listed below. As will be evident, the apparatus of the present invention overcomes the disadvantages of the prior art devices.

DETAILED DESCRIPTION OF PREFERRED EMBODIMENTS

Figure 1:
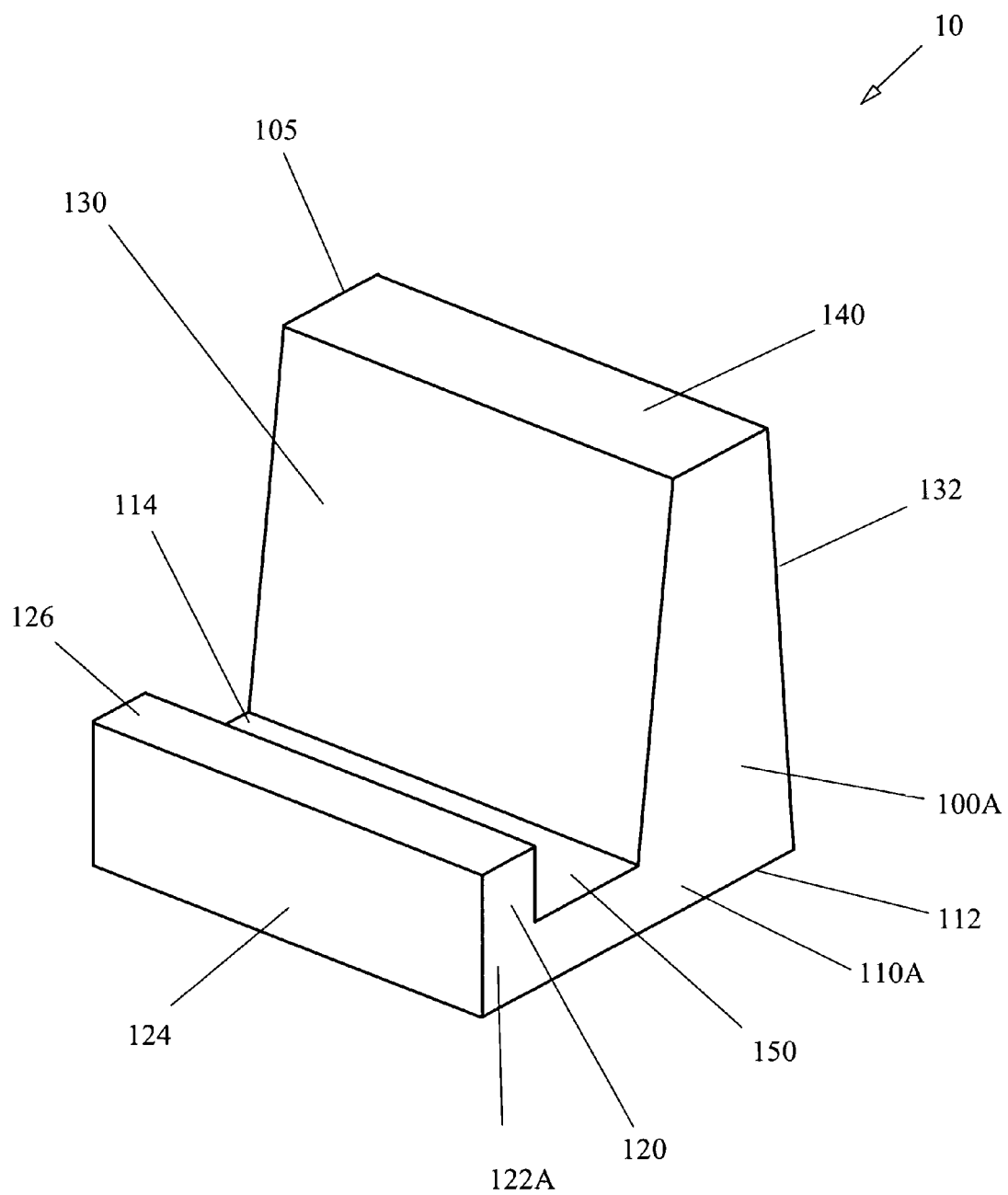
FIG. 1: is an isometric view of a first embodiment of the present invention.

As described briefly above, the apparatus of the present invention solves the two problems associated with prior art hot tub covers. Specifically, it provides a method for removing a hot tub cover without substantial effort and it allows the cover to be stored at a location away from the hot tub allowing an unrestricted view by the users of the tub. Looking at FIG. 1, a perspective view of a first embodiment 10 of the present invention is shown. As can be seen, the apparatus of the present invention is comprised of three basic geometric volumes: an upright back member formed by a vertically oriented trapezoidal solid volume, a base member formed by a first shallow horizontally oriented rectangular solid volume, and a front lip member formed by a second shallow horizontally oriented rectangular solid volume. For the discussion that follows, the upright back member will be denominated as the upright back member, the first shallow horizontally oriented rectangular solid volume will be denominated as the base member, and the second shallow horizontally oriented rectangular solid volume will be denominates as the front lip member.

The upright back member 105 is described by side panels 100A and 100B (not shown), top panel 140, rear panel 132, and front panel 130. Upright back member 105 also has a bottom panel that is not shown, however, those familiar with the art will recognize that such a base member does exist. The base member 150 is described by side panels 110A and 110B (not shown), base panel 112 and top panel 114. The base member 150 also has both front and rear panels that are not shown, however, those familiar with the art will recognize that such panels do exist. The front lip member 120 is described by side panels 122A and 122B (not shown), front panel 124, and top panel 126. It will be recognized by those of skill in the art that the front lip member 120 also has a rear panel and a base member, and while not shown they do exist.

When constructed, the upright back member 105 and front lip member 120 are placed on the top surface of the base member 150 forming essentially a "U" shaped empty space lying between the rear panel of the base member 150 and the front panel of the upright back member 105. This "U" shaped depression is dimensioned to accept the width of a hot tub cover.

In a preferred embodiment the apparatus of the present invention is constructed of high density foam using an extrusion process well understood by those of skill in the art. However, as will be recognized, the apparatus of the present invention could be constructed of any suitable material, such as plastic, acrylic, fiber-board, plywood, or sheet metal stock, thus the exact materials used should not be read as a limitation on the present invention. By way of example, but not a limitation, the volumes described above could be constructed of 0.25" plywood covered with a vinyl sheath and then fastened together using conventional fastening means. As will be discussed in detail below in conjunction with FIG. 4, the apparatus of the present invention is dimensioned such that when a hot tub cover is placed in the "U" shaped space lying between the rear panel of the base member 150 and the front panel of the upright back member 105, the hot tub cover is maintained in a stable orientation that prohibits the hot tub cover from falling over or being blown over in a breeze.

In operation, the user of a hot tub would place the apparatus of the present invention in close proximity to the side of the hot tub, tilt the hot tub cover and slide the edge of the cover into the "U" shaped space of the apparatus. If desired, the user can then relocate the apparatus with the hot tub cover in its stable orientation to a location away from the hot tub to allow for unobstructed visibility by users of the hot tub.

Figure 2:
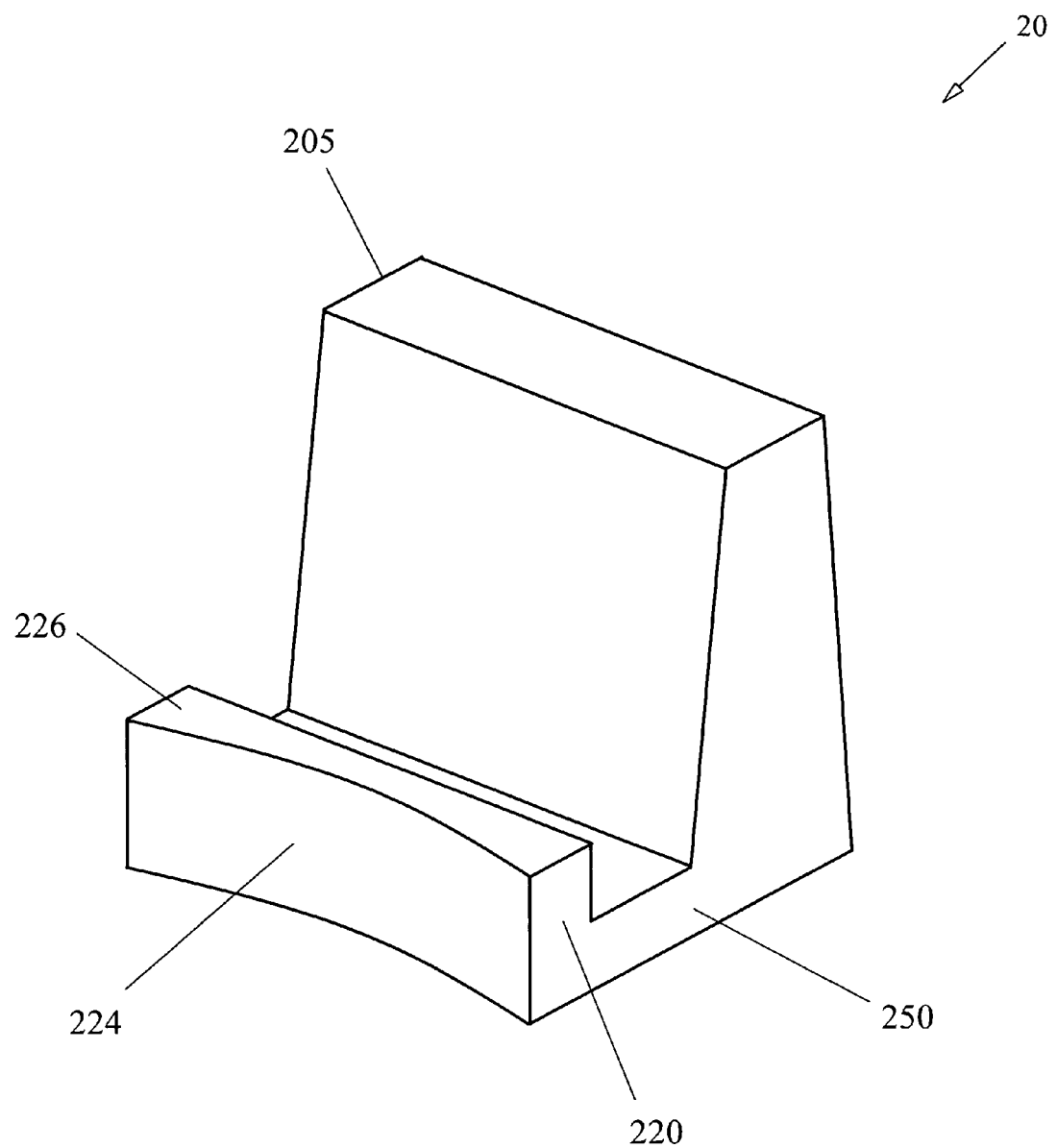
FIG. 2: is an isometric view of a second embodiment of the present invention.

Referring now to FIG. 2, a perspective view of a second embodiment 20 of the present invention is shown. As with the first embodiment 10 described in detail above, this second embodiment 20 is formed by three solid volumes: a upright back member 205, a base member 250, and a front lip member 220. Each of these volumes can be described by the same elements as for the first embodiment 10 of the present invention, thus are not repeated here for clarity. However, the lack of such a detailed discussion of the elements of the various volumes should not be read as a limitation on the apparatus of the present invention.

The second embodiment 20 of the present invention is substantially different than the first embodiment 10 as can be seen by the matching concave depressions in the front lip member 220 and base member 250. Many contemporary hot tubs have a curved surface or are circular in nature, thus the concave depression is advantageously designed to allow the apparatus of the present invention to be placed in close proximity to the curved side of the hot tub. Since the hot tub cover will have an essentially planar surface once it is placed in the "U" shaped space of the apparatus, there is no need to have the front panel of the upright back member 205 have a concave surface. In this second embodiment, the concave depression is three inches deep at the centerline of the front surface of the apparatus. However, it will be recognized by those skilled in the art that the depth of the concave depression could be more or less than this without departing from the spirit of the invention.

Figure 3:
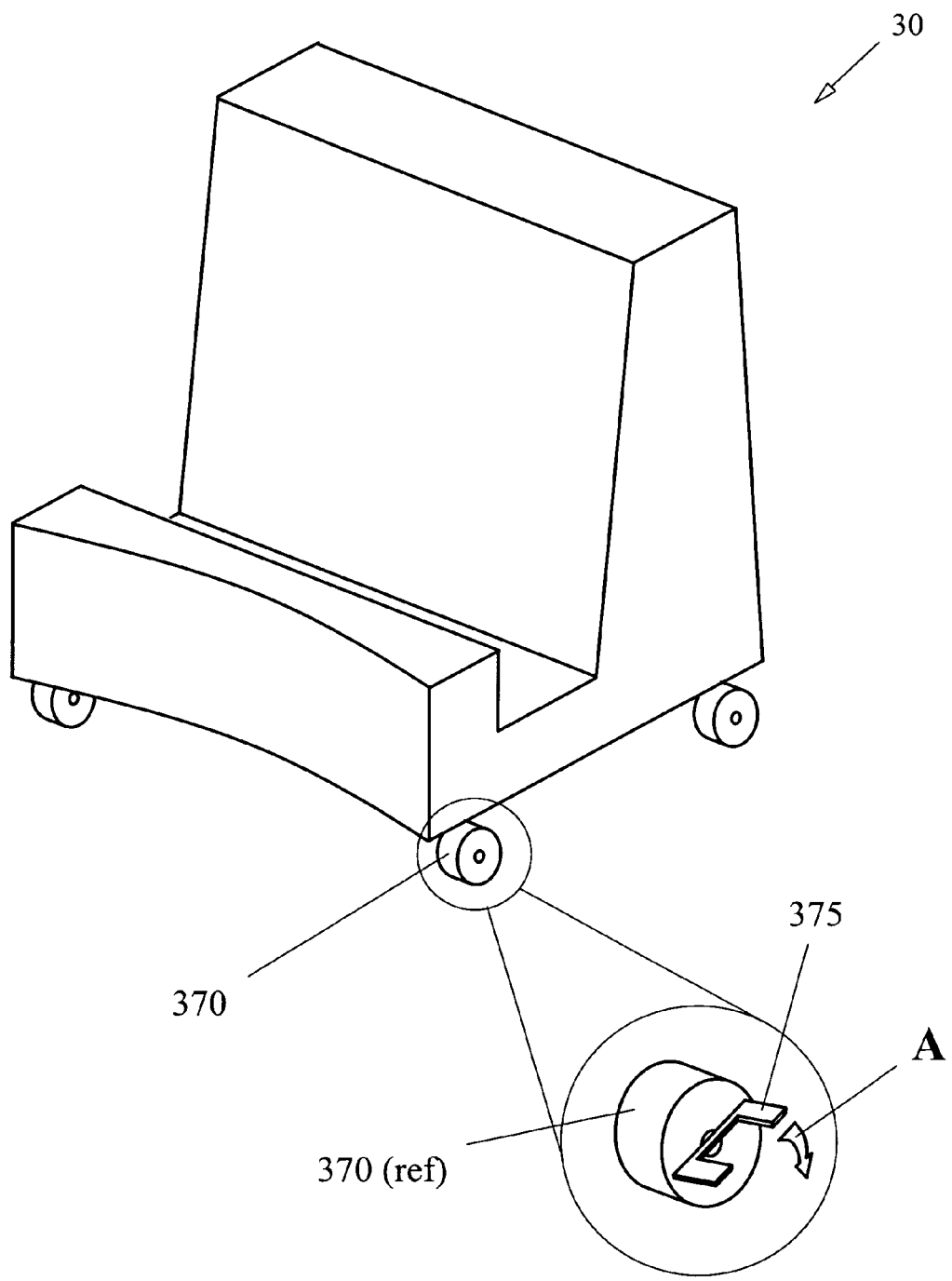
FIG. 3: is an isometric view of the present invention showing wheels for movability.

Looking now at FIG. 3, a third embodiment 30 of the present invention is shown. The three volumes of the third embodiment 30 are identical to either the first or second embodiments (10 or 20) described above, thus are not repeated here for clarity, however, this should not be read as a limitation on the scope of the invention. In this third embodiment 30, four wheel assemblies 370 have been attached to the bottom surface of the base member 150. The function of these wheel assemblies 370 is to allow the user to easily move the apparatus of the present invention away from the hot tub. The detail bubble shows that the wheel assemblies 370 have a locking lever 375. This foot operated lever is of the conventional type and is used to prevent the apparatus of the present invention from moving in a breeze. The user simply moves the lever 375 in a clockwise direction as shown by arrow A to lock the wheels. The reverse operation frees the wheels and allows the apparatus to again be moved.

Figure 4A:
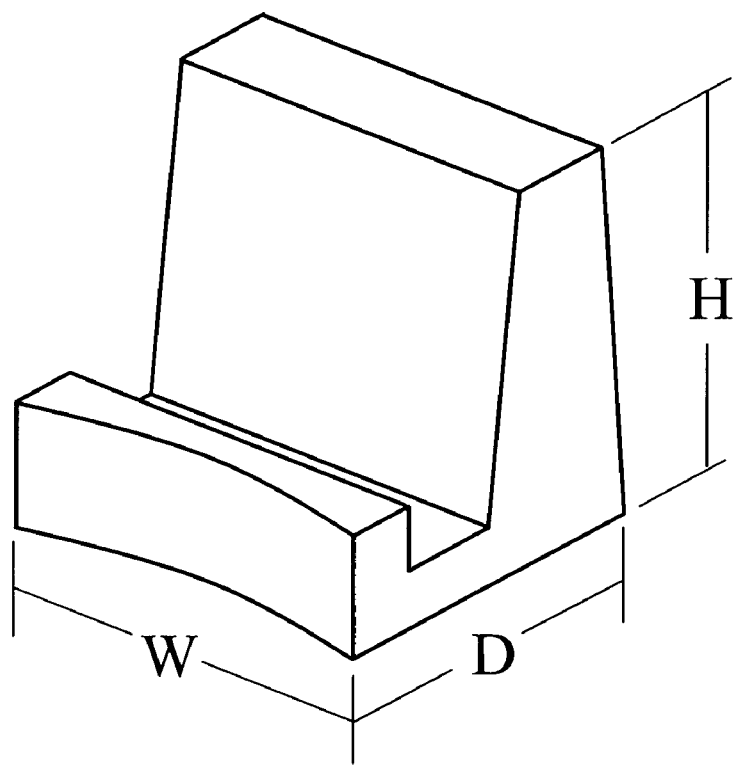
FIG. 4: shows the relative dimensions of the present invention.

FIG. 4 provides the detail of the relative dimensions of the apparatus of the present invention. FIG. 4A shows a perspective view of one embodiment of the present invention. Dimensions H, D and W represent the height, depth and width of the apparatus. The aspect ratio of W to D was selected to provide a stable base for the hot tub cover once it is placed in the apparatus for storage. Since most hot tub covers are generally the same size, a single apparatus properly dimensioned will accommodate the majority of the covers in use today. Of course the apparatus of the present invention can be made larger or smaller to accommodate special cover sizes without departing from the spirit of the invention. In a preferred embodiment the dimensions of the apparatus are H=24 inches, D=15 inches, and W=22 inches.

Figure 4B:
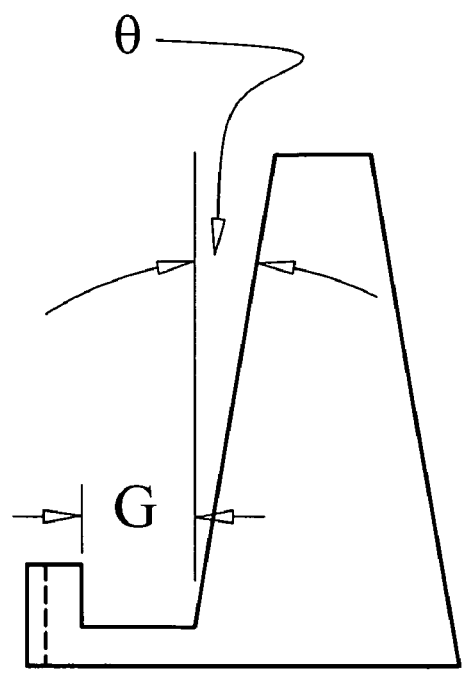

FIG. 4B provides a side view of the apparatus of the present invention showing one of the unique features of the invention. The front panel of the upright back member (105 of FIG. 1) is angled backward by angle $\theta$. The purpose of this angle $\theta$ is to allow the cover to tilt slightly backward when being stored. This rearward tilt yields positional stability both during movement and when stationary, preventing the cover from being blown about in a breeze. As will be discussed further below, in conjunction with FIG. 5, the angle $\theta$, in concert with another geometric feature form a three point capturing mechanism. In a preferred embodiment, the angle is 15 degrees. However, it will be understood that an angle $\theta$ of more or less than 15 degrees could be used without departing from the spirit of the invention, thus the apparatus is limited in scope only by the claims.

FIG. 4B also shows the gap dimension G. As previously indicated, most hot tub covers are generally the same size. However, some covers fold and others do not, thus the dimension G must be set to accommodate both types of covers. In a preferred embodiment, the dimension G is seven inches, but it will be recognized by those of skill in the art that a dimension G of more or less could be used without departing from the spirit of the invention, thus the apparatus is limited in scope only by the claims.

Figure 5A:
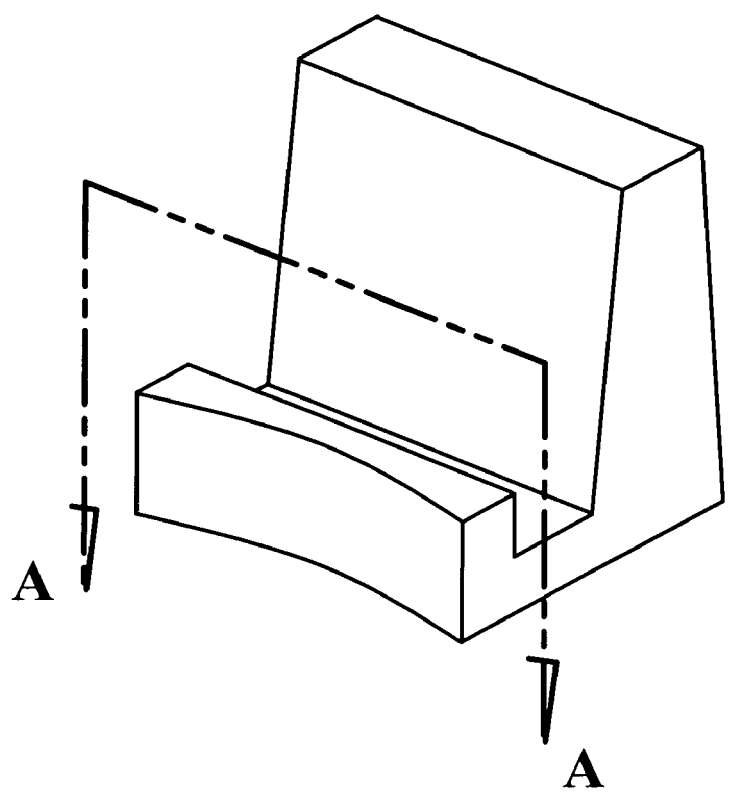
FIG. 5: provides a sectional view of the cover stabilization method.
Figure 5B:
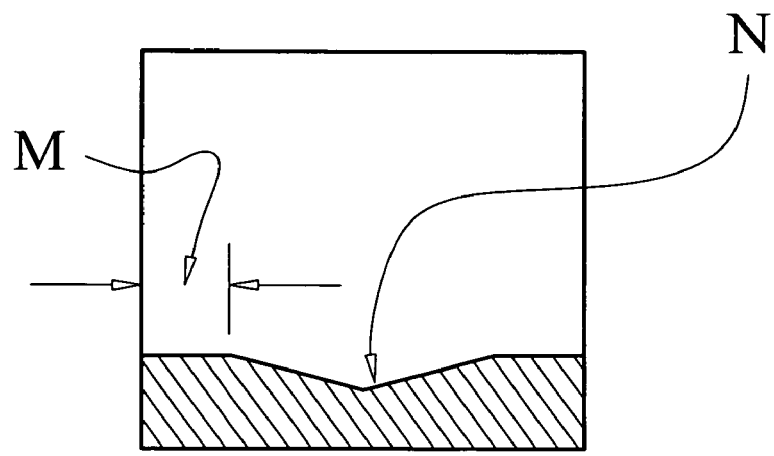

FIGS. 5A and 5B provide the detail of the capturing mechanism in a preferred embodiment of the present invention. FIG. 5A shows one embodiment of the present invention with a section line at A-A. Note that the wedge feature discussed below is present in all embodiments of the invention, so which exact embodiment is represented by the figure is inconsequential. FIG. 5B is the sectional view and, as can be seen, the gap G (of FIG. 4B), when viewed from the front, is characterized by two flat sections M and a wedge shaped detent N. Configured in this way, a three point mount is provided for any hot tub cover. For both flat and round covers, the first point of contact is the front panel of the upright back member (105 of FIG. 1). This occurs due to the angle θ described above. In the case of a round cover, two contact points are provided by the wedge shaped detent. In the case of a flat cover, two points of contact are provide by the flat sections M. Advantageously, this three point stabilizing mechanism prevents the hot tub cover from tossing about in a breeze or inadvertently falling off the apparatus during movement.

One advantage of the present invention is that it provides a user with a simple, easy to use method for storing a hot tub cover when the hot tub is in use.

A second advantage of the present invention is that certain embodiments of the apparatus of the present invention are equipped with lockable wheels that enable a user to move the cover away from the hot tub. This allows the users of the tub an unobstructed view.

A third advantage of the present invention is the unique three point mount for receiving a hot tub cover. By providing this three point mount for both rectangular and round hot tub covers, the present invention provides superior stability which helps to prevent the cover from being blown about in a breeze.

A fourth advantage of the present invention is that it is easily manufactured out of a variety of materials, thus is very economical.

What is claimed is:

1. An apparatus for moving and storing a hot tub cover comprising:
   a base member formed by a first shallow horizontally oriented rectangular solid volume, said base member having a front surface, a rear surface, a top surface, a bottom surface and two side surfaces, said base member having a depth of fifteen inches and a width of twenty-two inches, wherein each of the four corners of said bottom surface of said base member has a lockable wheel assembly affixed;
   an upright back member formed by a vertically oriented trapezoidal solid volume, said upright back member having a front surface, a rear surface, a top surface, a bottom surface and two side surfaces, said upright back member having a height of twenty-four inches, said front surface of said upright back member having a slope of fifteen degrees to the horizontal, such that a depth of said bottom surface dimension of said upright back member is greater than a depth of said top surface dimension of said upright back member and wherein said upright back member is at least twice the vertical dimension as said base member;
   a front lip member formed by a second shallow horizontally oriented rectangular solid volume, said front lip member having a front surface, a rear surface, a top surface, a bottom surface and two side surfaces, wherein said bottom surface of said upright back member and said bottom surface of said front lip member are seven inches apart and, said bottom surface of said upright back member and said bottom surface of said front lip member are affixed to said top surface of said base member such that a hot tub cover may be placed between said rear surface of said front lip member and said front surface of said upright back member.

2. An apparatus for moving and storing a hot tub cover comprising:
   a base member formed by a first shallow horizontally oriented rectangular solid volume, said base member having a front surface, a rear surface, a top surface, a bottom surface and two side surfaces, said base member having a width of twenty-two inches and a depth of fifteen inches, said front surface of said base member further having a first concave depression, said first concave depression being three inches deep at a center of said front surface of said base;
   an upright back member formed by a vertically oriented trapezoidal solid volume, said upright back member having a front surface, a rear surface, a top surface, a bottom surface and two side surfaces, said front surface of said upright back member having a slope of fifteen degrees to the horizontal, such that a depth of said bottom surface dimension of said upright back member is greater than a depth of said top surface dimension of said upright back member and wherein said upright back member is at least twice the vertical dimension as said base member;
   a front lip member formed by a second shallow horizontally oriented rectangular solid volume, said front lip having a front surface, a rear surface, a top surface, a bottom surface and two side surfaces, said front surface of said front lip having a second concave depression, said second concave depression being three inches deep at a center of said front surface of said front lip, wherein said bottom surface of said upright back member and said bottom surface of said front lip member are seven inches apart and wherein said bottom surface of said upright back member and said bottom surface of said front lip member are affixed to said top surface of said base member and said first concave depression aligns with said second concave depression, such that said first concave depression and said second concave depression fit in close proximity to an outer diameter of a round hot tub and wherein a hot tub cover may be placed between said rear surface of said front lip member and said front surface of said upright back member.

* * * * *